May 30, 1939. J. A. JENSEN ET AL 2,160,741
DISTRIBUTOR CONTROL VALVE FOR TANK VEHICLES
Filed Feb. 5, 1937 6 Sheets-Sheet 1
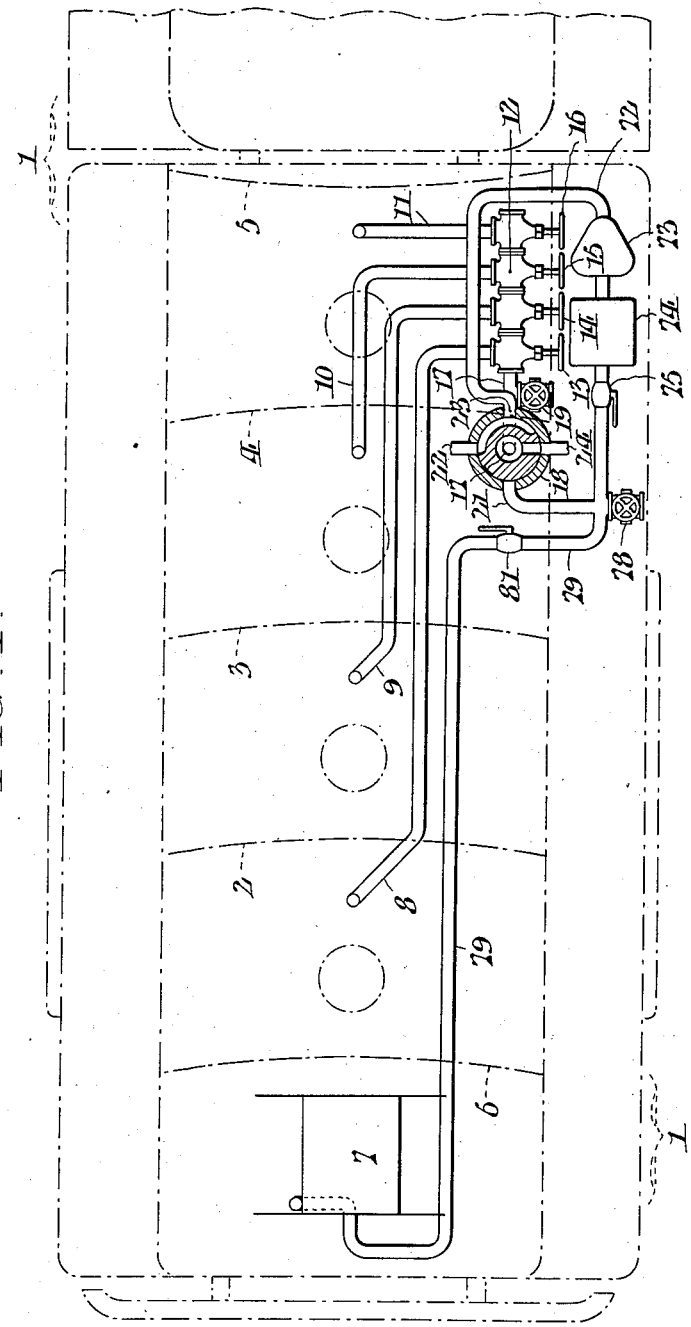
FIG. I.
WITNESSES:
John A. Weidler
William Bell, Jr.
INVENTORS:
James A. Jensen &
Ralph B. Ziegler,
BY Fraley Paul
ATTORNEYS.

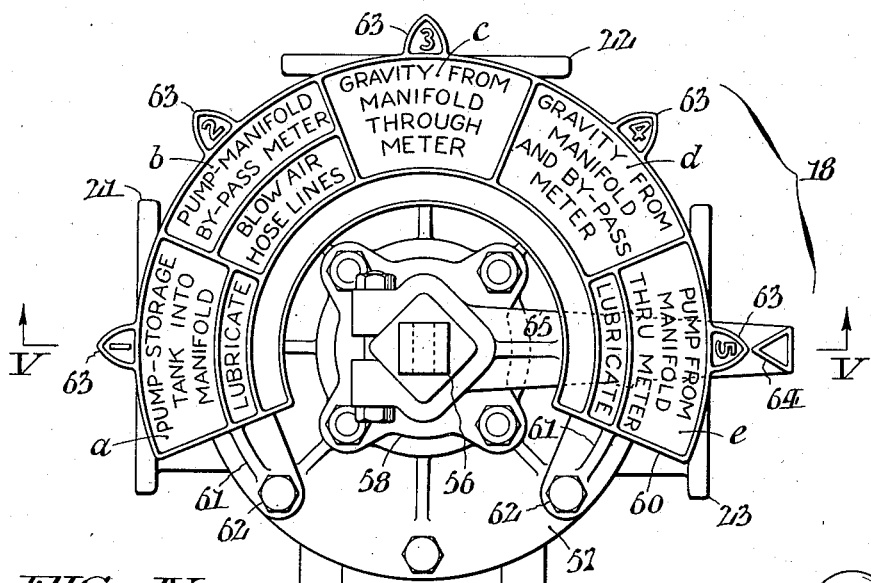
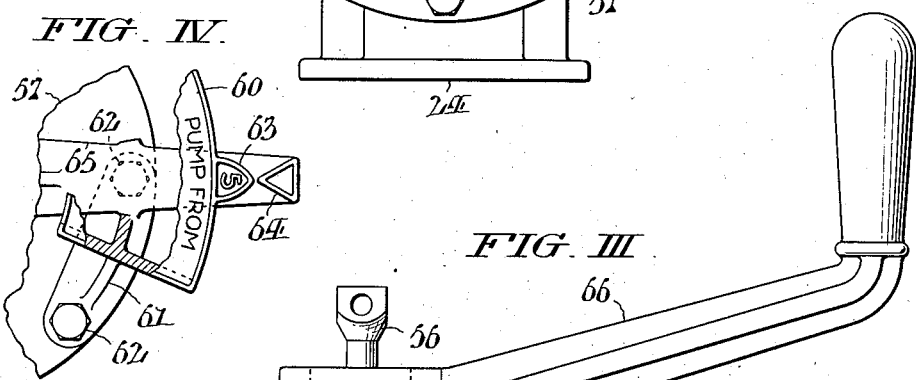
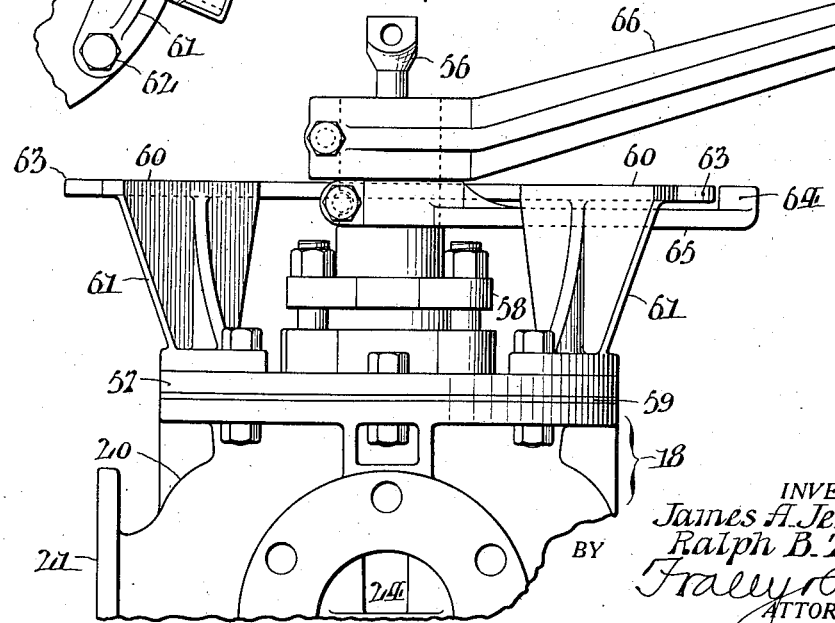

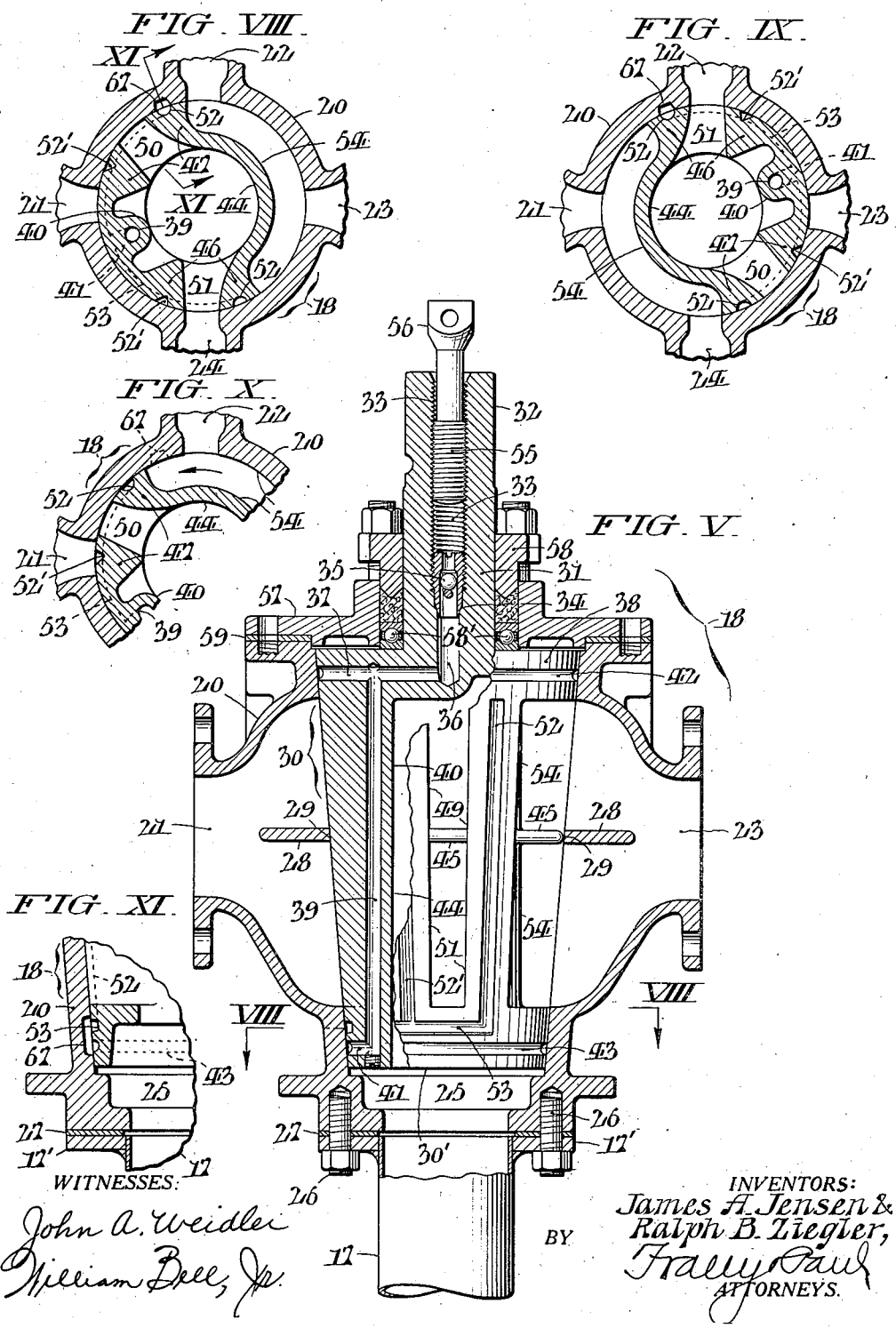

May 30, 1939. J. A. JENSEN ET AL 2,160,741
DISTRIBUTOR CONTROL VALVE FOR TANK VEHICLES
Filed Feb. 5, 1937 6 Sheets-Sheet 4
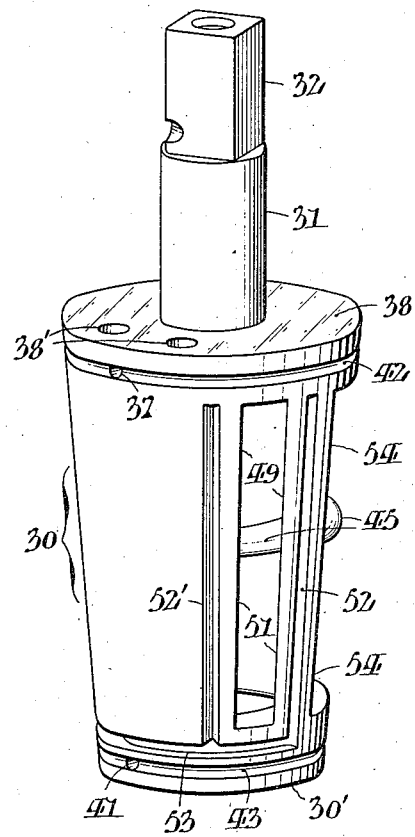
FIG. VI.
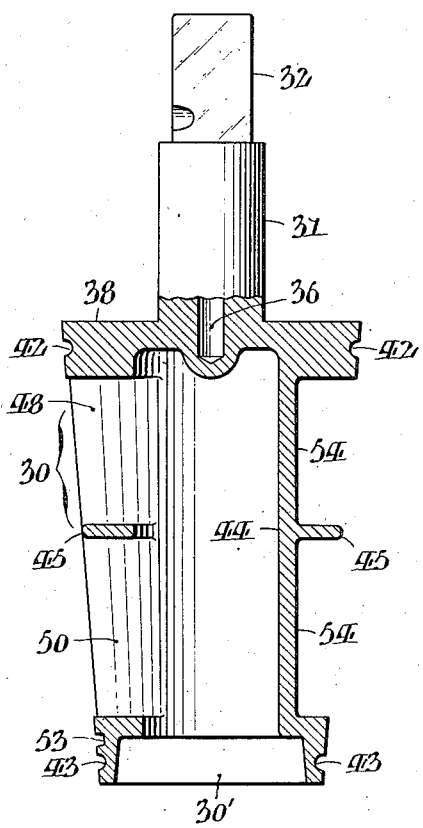
FIG. VII.
WITNESSES:
John A. Weidler
William Bell, Jr.
INVENTORS:
James A. Jensen &
Ralph B. Ziegler,
BY
ATTORNEYS.

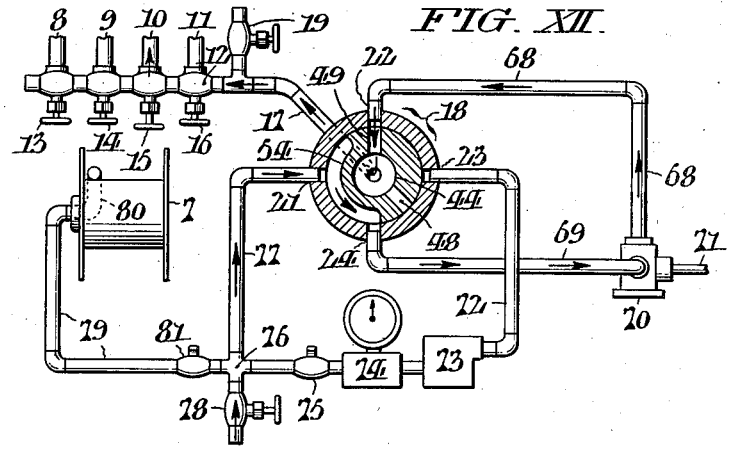
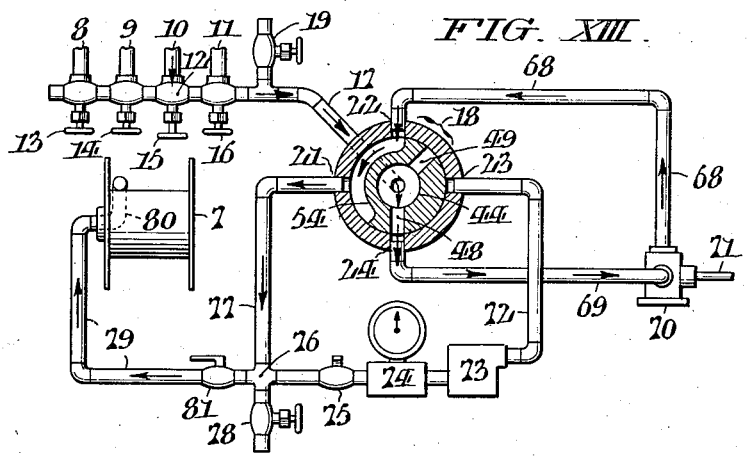
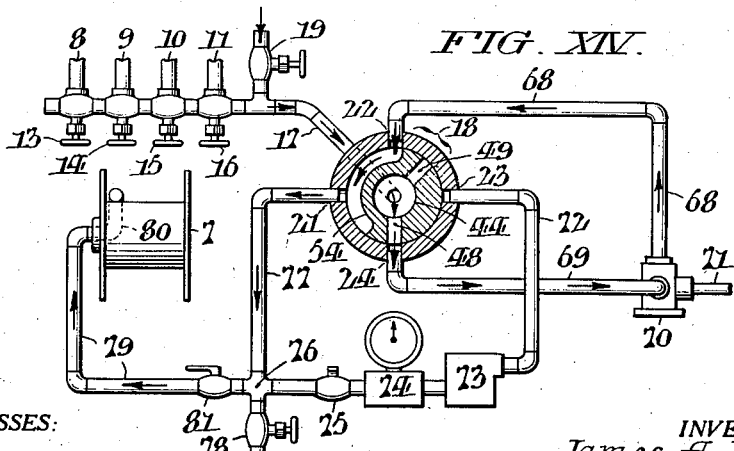

May 30, 1939.   J. A. JENSEN ET AL   2,160,741
DISTRIBUTOR CONTROL VALVE FOR TANK VEHICLES
Filed Feb. 5, 1937   6 Sheets-Sheet 6
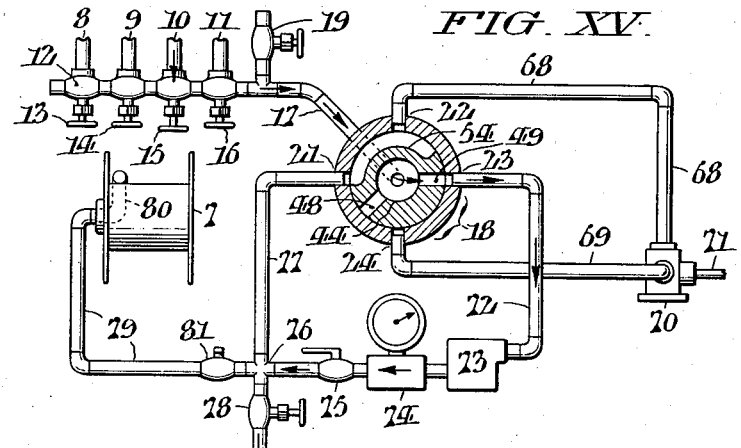
FIG. XV.
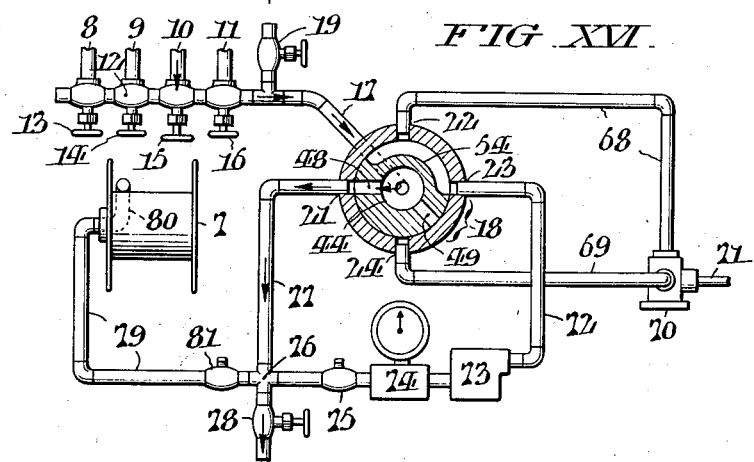
FIG. XVI.
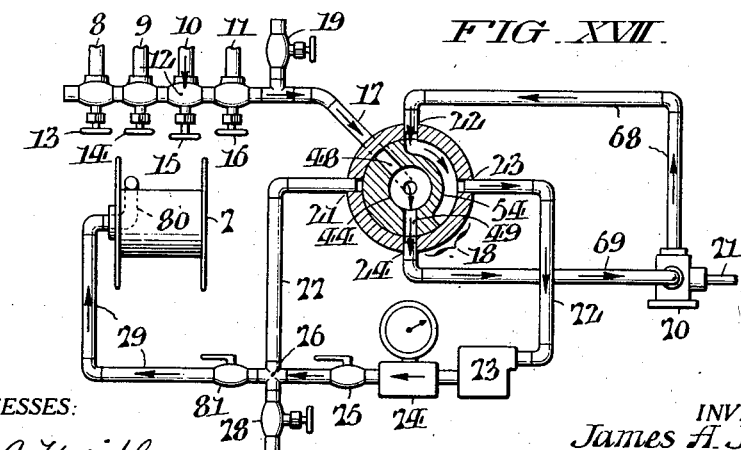
FIG. XVII.
WITNESSES:
John A. Weidler
William Bell, Jr.
INVENTORS:
James A. Jensen &
Ralph B. Ziegler,
BY
ATTORNEYS.

Patented May 30, 1939

2,160,741

UNITED STATES PATENT OFFICE 2,160,741

DISTRIBUTOR CONTROL VALVE FOR TANK VEHICLES

James A. Jensen and Ralph B. Ziegler, Philadelphia, Pa., assignors to Quaker City Iron Works, Philadelphia, Pa., a corporation of Pennsylvania Application February 5, 1937, Serial No. 124,189

13 Claims. (Cl. 251—93)

This invention has reference in its broader aspects to distributor systems including piping through which predetermined flow is governed by operation of a single control device and, more particularly, the present improvements relate to a distributor control for multi-compartment tank vehicles such as are ordinarily used in the transportation of liquid products like fuel oils, lubricating oils, gasoline and so forth. Tank vehicles of the type indicated are usually arranged so that the various liquids contained in the several compartments can be pumped through a meter and reel, through the meter only, or allowed to discharge by gravity by way of said meter or to by-pass it. In addition, it is sometimes necessary to pump oils or other liquids out of ground or other storage tanks back into the truck compartments, in case the wrong grade of oil has been delivered or has to be removed for other causes; while in some cities it is required by law that the delivery hose line and piping be blown clear after deliveries, etc., are made.

The primary object of this invention is to provide a novel distributor control of the type above indicated in which the piping and number of valves are respectively simplified and reduced to the minimum.

Another important object is to provide a distributor for multi-compartment tank vehicles comprising a single control valve which is connectable with the oil pump, meter and reel, or may be turned to effect flow control from any one or more of the tank compartments; or between selected compartments.

A further object is the provision of an improved type of multi-way distributor valve embodying novel means for its efficient lubrication.

Other objects and advantages, more or less ancillary to the foregoing, and the manner in which they are realized in practice, will be apparent from a more complete examination of the following description which, considered in connection with the accompanying sheets of drawings, sets forth one practical embodiment of the inventive features.

Generally stated, this invention consists of the novel devices, combinations of means, and arrangements of parts hereinafter disclosed, illustrated by the drawings, and more tersely expressed in the claims at the conclusion hereof.

In the drawings:

Fig. I is a plan view of a multi-compartment tank vehicle embodying the essential features of this invention; said vehicle being indicated in dot-and-dash outline, with the forepart broken away for convenience in illustration.

Fig. II is a top plan view of an improved multi-way control valve forming an important item in the novel distributor system of this invention.

Fig. III is an elevation of the upper portion of the control valve.

Fig. IV is a fragmentary detail, partly in section, and later on more fully described.

Fig. V is a vertical section through the valve, with the plug mainly in elevation to better illustrate certain lubricator passages or grooves, as viewed approximately on the plane V—V of Fig. II.

Fig. VI is a perspective view of the valve plug.

Fig. VII is an axial section of the valve plug, with the stem in elevation.

Fig. VIII is a sectional plan on the plane VIII—VIII of Fig. V.

Fig. IX is a corresponding section with the valve plug in a different position.

Fig. X is a somewhat similar fragmentary section showing the plug in a further position.

Fig. XI is a vertical section, taken as indicated by the arrows XI—XI in Fig. VIII.

Fig. XII is a broken plan view of a distributor system with the control valve plug of this invention in position for pumping from a source of supply or storage of liquid into any selected compartment or compartments of the tank vehicle.

Fig. XIII is a similar view, showing how pumping from any selected tank compartment through the reel with by-passing of the meter is effected.

Fig. XIV illustrates how air may be blown through the system and hose line.

Fig. XV is a similar view to Figs. XII-XIV, but showing how any selected tank compartment can be emptied by gravitation through the meter.

Fig. XVI is a corresponding illustration showing how emptying of any selected tank compartment is effected by gravity with by-passing of the meter; and, Fig. XVII is a like view, showing how to pump from any selected compartment through the meter and reel.

In all the views, corresponding parts are designated by like reference characters.

Referring more in detail to the drawings, and firstly to Fig. I, the outline of a standard type of multi-compartment tank vehicle for the transportation of liquids is comprehensively designated by the reference character 1, and the respective compartments by the numerals 2, 3, 4, and 5; while the customary utility or bucket-box is designated as 6, and in which is located the conventional hose reel 7. Each of the compartments 2–5 inclusive, is provided with an outlet or discharge conduit respectively characterized 8, 9, 10 and 11, all connecting into a manifold including associated cross-valve units 13, 14, 15 and 16, whereby discharge of liquid from the compartments aforesaid is controlled and shut-off in accordance with known practice.

From one end of the manifold 12 a pipe 17 connects into the bottom of the single multi-way control valve of this invention and as best understood from Fig. V and Figs. XII–XVII, inclusive, said valve being comprehensively designated 18, and the pipe connection thereto having an interposed gate valve 19, for a purpose later on fully explained.

Referring now, more particularly, to Figs. II–XI, inclusive, the multi-way control or distributing valve 18 comprises a body portion 20 preferably having four circumferentially-spaced branches 21, 22, 23 and 24, with a base inlet 25 to which the suitably flanged end 17' of the pipe 17 is attached, as by studs 26 with an interposed appropriate gasket 27 to ensure a fluid-tight juncture. Medially of the valve body portion 20 is a flow-distributing and reinforcing flange 28, having a coaxial opening 29, through which the valve plug 30 passes. This plug 30, as separately illustrated in Figs. VI and VII, is of novel formation, that is to say it is generally of inverted frusto-conical shape, and embodies a tubular stem 31, the upper portion 32 of which is preferably of rectanguler cross-section, while the bore thereof is provided with a screw-thread 33, a seat 34 for a check valve 35, and a further reduced passage 36 in flow-communication with a radial duct 37 in the valve plug head 38. The radial duct 37, in turn, communicates into a passage 39 extending through a longitudinal rib 40, in parallel relation to the plug axis, with a radial outlet 41 through said rib in the lower end 30' of the valve plug 30; while said radial duct 37 and outlet 41, respectively open out into circumferential grooves 42, 43 around the plug 30, for a purpose hereinafter set forth. It is also to be observed that the valve plug 30 is formed with an axial bore 44 and a reinforcing rib or medial diaphragm 45, in the same plane as that of the valve body diaphragm 28 hereinbefore referred to, said former diaphragm serving to substantially separate elongated passages through the plug wall spaced ribs or enlargements 46, 47 into upper and lower ports 48, 49 and 50, 51, respectively, and to reinforce the valve. In addition to the just pointed out structural features of the valve plug 30, it is to be further noted said plug is provided with exterior longitudinal grooves 52, 52' and a lower common connecting-groove 53, to each side and below the ports 48, 49 and 50, 51, for collection and distribution of lubricant; and also that by virtue of the spaced ribs or enlargements 46, 47, there is defined in the plug 30 an arcuate-section longitudinal cut-out 54 intermediate said enlargements and the plug head 38 and its cylindrical lower portion 30'.

Operative in the threaded bore of the valve plug tubular stem 31 is a grease-screw 55 having an appropriate head 56 whereby it can be manipulated or removed for supply of a suitable lubricant into the bore part 33 and check valve 35 and from thence forced into the connecting passages, ducts and grooves 36, 37, 39, 41, 42 and 43.

Fitting the top of the valve body 20 is a cover 57 including a gland 58 for ensuring a leakage-proof joint around the valve plug stem 31 and an anti-friction bearing 58' to prevent binding of the plug 30 in the valve body 20; while an interposed gasket 59 between said cover and body portion effects a similar joint thereat. Surmounting the cover 57 is a quadrant 60, Figs. II–IV, having bracket portions 61, by means of which it is supported in spaced relation to said cover through the medium of suitable securing devices 62. This quadrant 60 as best understood from Fig. II, is conveniently divided into five sections as illustrated, and consecutively marked a, b, c, d and e, each of which bears appropriate data or legends with an associated pointer 63, for registration by a projection 64 at the outer end of an indicator arm 65 clamped to the rectangular portion 32 of the plug stem 31; while an appropriate valve operating handle 66 is likewise attached to said rectangular portion. A by-pass groove 67 affords flow-communication between the circumferential groove 43 and the connector groove 53 only in predetermined positions of the valve plug 30 relative to the valve 18, as hereinafter more fully explained.

Referring now more particularly to Figs. I, II, and XII–XVII, inclusive, the branches 22, 24, of the multi-way control valve 18, are respectively connected by pipes 68, 69 to a suitable pump 70 operative by a shaft 71, from any suitable source of power such as the vehicle motor; while the valve branch 23 communicates by a pipe 72 to an air separator 73, in turn connected to an appropriate meter 74, quantrol valve 75 and four-way union 76, and from one branch of the latter a pipe 77 connects with the branch 21 of the valve 18. Opposed to, or in alignment with, the pipe 77 is a supply connection including a stop valve 78; and in similar relation to the pipe 72 is a flow connection 79 to the reel nozzle 80, said connection having an interposed handy-gate valve 81.

The operation of the multi-way control valve 18 will now be described, it being assumed firstly that the operating handle 66 has been turned through 180° to bring the indicator arm projection 64 into registration with the pointer 63 of the quadrant section a. Now it will be apparent by reference to Figs. IX and XII that by applying a suitable connection such as a hose line, not shown, to an underground storage tank or other source of liquid supply for filling any selected tank compartment 2—5, opening the stop valve 78, and setting the pump 70 in operation, liquid from such storage or supply will be drawn by way of the pipe 77 and branch 21 into the valve 18, through the arcuate cut-out 54 of the plug 30 and pipe 69, to the pump 70; and forced by said pump through the pipe 68, branch 22 and ports 49, 51, into the plug bore 44 and pipe 17 to manifold 12 and tank compartment 4 (for example), should the associated valve 15 be the selected one opened. On the other hand, if it is desired to fill the tank compartment 4, or any other selected one whose valve 13—16 may be open at the time, by suction through the hose on the reel 7, the operator simply closes the stop valve 78 and opens the handy-gate valve 81. Furthermore, if it is desired to use the pump 70 independently for any desired purpose, the manifold valves 12 will be all closed and the gate valve 19 opened for discharge, whereupon the pumping cycle will be as above first described excepting that discharge takes place through said valve 19.

When the operating handle 66 is turned to bring the projection 64 into registration with the pointer 63 of the quadrant section b for the purpose of pumping liquid from any one of the tank compartments 2—5 (or 4 as above referred to) and to by-pass the meter 74, the valve 15 is opened as well as the valve 81, while the valves 19, 75 and 78 are closed. On reference to Fig. XIII, it will be seen that the resulting suction-flow is from the compartment 4 through pipe 17, valve plug bore 44, ports 48, 50, passage 24, and pipe 69, to the pump 70; from whence it is forced by way of the pipe 68, branch 22, plug cut-out 54, branch 21, pipes 77 and 79 to the reel nozzle 80 to discharge; thereby by-passing the meter 74. Or, by closing the valve 81, discharge may be effected via the stop valve 78 upon opening the latter.

When it is desired to blow air through the pipe and hose lines of the system, the indicator arm 65 is placed as set forth in the preceding paragraph, all the manifold cross-valves 13—16, as well as the valves 75, 78 being closed, and the valves 19, 81 opened. On reference to Fig. XIV, when the pump 70 is set in motion, it will be seen that air will be drawn through the open valve 19 and pipe 17 into the valve plug bore 44; thence through the ports 48, 50, branch 24 and pipe 69 to the pump 70; by which it is forced through the pipe 68, branch 22, valve plug cut-out 54, branch 21, pipes 77, 79 and hose nozzle 80 to clean out the parts aforesaid and the hose (not shown) connected to the nozzle 80 free of any contained liquid, resultant from making a delivery or otherwise, as is required by law in some parts of the country.

In order to empty any one, or all, of the vehicle tank compartments 2—5 by gravity through the meter 74, the indicator arm 65 is moved by the operating handle 66 to bring the projection 64 into registration with the pointer 63 of the quadrant section c, whereupon the manifold cross-valve 15, for example, or any other or all of the valves 13—16, is or are opened, as well as the valves 75, 78; while the valves 19 and 81 are closed. The resultant gravity flow, see Fig. XV, from the valve 15 will be by way of the pipe 17, valve plug bore 44, ports 49, 51, branch 23, pipe 72, air separator 73, meter 74, valve 75, union 76, and valve 78 to discharge. Somewhat similarly for gravity emptying of any one or more of the tank compartments 2—5 with by-passing of the meter 74, the indicator arm 65 is moved into registration with the pointer 63 of the quadrant section d, and assuming the various valves being placed in the respective open and closed positions just above described, all the change made is to simply close the valve 75; or, in other words, have the valves 19, 75 and 81, closed with the tank compartment valve 15, for example, and the valve 78 open. The gravity-flow course from the valve 15, see Fig. XVI, will be via pipe 17, valve plug bore 44, ports 48, 50, branch 21, pipe 77, union 76, and valve 78, to discharge.

To pump from any one or more of the tank compartments 2—5 through the meter 74 and reel 7, the indicator arm 65 is turned to bring its projection 64 into registration with the pointer 63 of the quadrant section e, whereupon the valves 19 and 78 are closed, and the valves 75, 81 opened. Upon setting the pump 70 in operation, the suction flow will be from the valve 15, for instance, through the pipe 17, valve plug bore 44, ports 49, 51, branch 24 and pipe 69 to said pump, while the discharge is by way of the pipe 68, branch 22, plug cut-out 54, branch 23, pipe 72, air separator 73, meter 74, valve 75, union 76, valve 81 and pipe 79 to the reel nozzle 80. By closing the valve 81, discharge may, obviously, be effected through the valve 78 upon opening the latter.

Attention is now directed to the lubricating of the valve 18, and which is only effected when the plug 30 registers with the quadrant positions designated a and e, or its first and fifth setting, respectively; inasmuch as only in said positions of the plug will the one or the other end of the arcuate connector-groove 53 be in registration with the by-pass groove 67. When in the position e, for example, Figs. VIII and IX, it will be apparent that lubricant can pass from the plug lower circumferential groove 43 to the arcuate connector groove 53 via the by-pass 67. Similarly when the valve plug 30 is in first position designated a on the quadrant 60, the opposite end of the arcuate connector groove 53 will be in registration with the by-pass groove 67. In both of these positions it will be apparent that by inward progression of the grease screw 55 lubricant can be forced past the stem check-valve 35, into the plug passages 36, 37, circumferential upper groove 42, as well as downwardly through the passage 39, to the radial outlet 41 and lower circumferential groove 43, by-pass groove 67 to the arcuate connector groove 53, and finally upwards in the longitudinal grooves 52 and 52'. Otherwise expressed, when the valve 18 is in positions a and e the by-pass 67 connects the bottom groove 43 and upper arcuate connector groove 53. Lubricant can now be forced under pressure into all of the grease grooves. The lubricant is checked by means of the ball valve 35 and a pressure maintained. If the vertical grease grooves 52, 52' were not cut off from the source of supply as soon as the valve 18 is moved from position a or e they would be uncovered as they passed over the valve ports or branches 21—24, and as the lubricant is under pressure it would be forced out into said branches. The cut-off prevents this occurring and disconnects the vertical grooves 52, 52' from the source of supply; passages 36, 37 and 39, etc. If it were possible to force lubricant into the vertical grooves 52, 52' at any position, the lubricant would be lost when the vertical grooves are exposed to a port opening or branch 21—24. In all of the other positions b, c and d of the plug 30, the by-pass 67 will be cut-out or shut-off as readily appreciated from Fig. X and examination of the drawings.

It is to be remarked that the valve plug 30 is balanced against vertical displacement by providing in the top of the valve plug 30, orifices 38', Fig. VI, preferably to each side of the longitudinal rib 40, so as to permit access of the liquid passing through the valve 18 to enter the space intervening said plug top and the underside of the cover 57, so as to maintain the plug 30 normally in operative coaction with its seat, in an obvious manner.

From the foregoing disclosure it will be clearly apparent that we have produced a novel distributor control valve that fulfills the objects of the invention as set forth in the opening paragraphs of this specification. Furthermore, while there has been clearly described a preferred embodiment of the invention, still in practice many deviations from the precise structure set forth may be resorted to which do not constitute any departure from the spirit and scope of said invention; accordingly, the right is hereby reserved to all variations in detail, as well as other applications of the inventive items involved, that may be comprehended by reasonable interpretation accorded the following claims.

Having thus described our invention, we claim:

1. In liquid distributor control systems as hereinbefore defined a multi-way control comprising a valve casing with circumferentially-spaced branches and a flow inlet, an annular flow separating flange in the casing having a coaxial orifice; and a valve member in said casing having an axial bore with lateral ports and including a diaphragm portion coactive with the casing flange aforesaid in defining different flows through the control.

2. In liquid control systems including a multi-way control comprising a valve casing with circumferentially-spaced branches, a flow-inlet, and an interior apertured flange-like reinforcement; an axially bored laterally ported valve member in the casing including a rib-portion coactive with the flange-like reinforcement aforesaid in governing flow through the valve casing, spaced grooves in the valve member wall with a common connection at one end and an associated circumferential lubricant feed groove, and a by-pass in the casing wall whereby the lubricant can only be supplied to the connected grooves from said feed groove when the remote ends of the common connection aforesaid register with the by-pass.

3. In liquid control systems including a multi-way control comprising a valve casing with circumferentially-spaced orifices, a flow-inlet and an interior apertured reinforcing flange; the combination of a ported and axially bored valve member in the casing including a rib-portion coactive with the casing interior flange in governing flow through the control; plural longitudinal grooves in said plug outer portion with a common connection at their lower ends and an associated circumferential feed groove, and a vertical by-pass in the casing wall whereby lubricant can only be injected when one of said longitudinal grooves is in registration with the by-pass.

4. In liquid control systems including a multi-way control comprising a casing with opposed flow branches, a flow-inlet, and a medially-located orificed reinforcing flange; the combination of a plug valve in the casing having an axial bore and spaced longitudinal ports with an intervening cut-out, a medial annular rib dividing the longitudinal ports into separate portions and coactive with the reinforcing flange of the casing in governing flow through the control; and associated passages and spacedly connected grooves in the plug valve with a single by-pass in the casing inner wall whereby lubricant can only be forcedly by-passed into the said grooves when the plug valve is turned into either of two predetermined positions.

5. In liquid control systems including a multi-way control comprising a casing with diametrically-opposed flow branches, a basal flow-inlet, and a medially-located interior apertured flange; the combination of a plug valve with a tubular stem, said valve having an axial bore and circumferentially-spaced longitudinal ports with an intervening arcual cut-out, and a surrounding rib separating the longitudinal ports into upper and lower portions and coactive with the apertured flange in the casing for governing flow through the control; radial and longitudinal passages in, with circumferential and connected longitudinal grooves about, the plug valve, a by-pass in the casing inner wall, and means whereby lubricant can be injected by way of the valve stem bore passages and connected longitudinal grooves only when either of the latter grooves is in registration with the by-pass.

6. A plug valve as defined in claim 5 provided with a radial passage from its tubular stem bore to an upper circumferential groove about the plug valve, a down passage from said radial outlet to a lower radial passage communicating into another associated circumferential groove, said valve also having spaced longitudinal grooves with a common arcual connector-groove at their lower ends about the second mentioned circumferential groove, and a by-pass groove in the valve casing inner surface which, when the plug remotely-spaced ends of the arcual connector-groove only register therewith, afford flow-passage for lubricant from the plug stem into all of the passages, grooves and by-pass groove aforesaid.

7. In a multi-way control for liquid distributor systems comprising a casing with diametrically-opposed flow branches, a basal flow-inlet, and an interior apertured reinforcing flange; the combination of a plug valve having an axial bore and spaced longitudinal ports with an intervening cut-out divided into upper and lower sections, and a medial reinforcing rib for coaction with the casing interior apertured flange, said valve embodying a tubular stem including an interiorly screw-threaded portion, an axially aligned passage of less diameter defining a seat, and a radial outlet from said passage into a circumferential groove around the valve head; a down passage through the valve body with a radial outlet into an associated lower circumferential groove; spaced longitudinal grooves in the plug valve outer surface with a common connector groove at their lower ends; and a longitudinal by-pass groove in the casing inner surface adapted to complete flow-passage from the plug stem into all of the outlets, grooves and passages only when the spaced longitudinal grooves are respectively moved into registration with said by-pass groove.

8. In a multi-way control for liquid distributor systems comprising a casing with diametrically-opposed flow branches, a basal flow-inlet, and an interior medially-located apertured reinforcing flange; the combination of a plug valve having an axial bore and spaced longitudinal ports with an intervening cut-out divided into upper and lower sections, and a circumferential reinforcing rib for coaction with the casing interior flange, said valve embodying a tubular stem including an interiorly screw-threaded portion, an axially aligned passage of less diameter defining a seat, and a radial outlet from said passage into a circumferential groove around the valve head; a down passage through the valve body with a radial outlet into an associated lower circumferential groove; spaced longitudinal grooves in the plug valve outer surface with a common connector groove at their lower ends; a longitudinal by-pass in the casing inner surface completing flow communication through and about the plug valve only when the lower portions of the spaced longitudinal grooves respectively register therewith; means for supplying lubricant under pressure to the valve tubular stem; a check valve in the tubular stem engaging the seat portion therein; and rotative means in the steam screw-threaded portion whereby lubricant can be forced through the check valve into all of the passages, outlets and grooves aforesaid.

9. In a multi-way control for liquid distributor systems comprising a casing with diametrically-opposed flow branches, a basal flow-inlet, and an interior medially-located apertured reinforcing flange; the combination of a plug valve having an axial bore and spaced longitudinal ports with an intervening cut-out divided into upper and lower sections, and a medial reinforcing rib for coaction with the casing interior flange, said valve embodying a tubular stem including an interiorly screw-threaded portion, an axially aligned passage of less diameter defining a seat, and a radial outlet from said passage into a circumferential groove around the valve head; a down passage through the valve body with a radial outlet into an associated lower circumferential groove; spaced longitudinal grooves in the plug valve outer surface with a common connector groove at their lower ends; a longitudinal by-pass in the casing inner surface completing flow communication through and about the plug valve only when the lower portions of the remotely spaced longitudinal grooves register therewith; means for supplying lubricant under pressure to the valve tubular stem; a check valve in the tubular stem engaging the seat portion therein; a screw engaged in the valve stem threaded-portion with means whereby it can be independently rotated to force lubricant past the check valve into all of the passages, outlets and grooves aforesaid; and means defining variable stop positions for the valve to govern different flows through the control.

10. In a multi-way control for liquid distributor systems comprising a casing with diametrically-opposed flow branches, a basal flow-inlet, and an interior medially-located apertured reinforcing flange; the combination of a plug valve having an axial bore and spaced longitudinal ports with an intervening cut-out divided into upper and lower sections, and a reinforcing rib for coaction with the casing interior flange, said valve embodying a tubular stem including an interiorly screw-threaded portion, an axially aligned passage of less diameter defining a seat, and a radial outlet from said passage into a circumferential groove around the valve head; a down passage through the valve body with a radial outlet into an associated lower circumferential groove; spaced longitudinal grooves in the plug valve outer surface with a common connector groove at their lower ends; a longitudinal by-pass in the casing inner surface completing flow communication through and about the plug valve only when the lower portions of the remotely spaced longitudinal grooves register therewith; means enabling supply of lubricant under pressure into the valve tubular stem; a check valve in the tubular stem engaging the seat portion therein; a screw engaged in the valve stem threaded-portion with means whereby it can be independently rotated to force lubricant past the check valve into all of the passages, outlets and grooves aforesaid; means defining and rotatively governing different positions of the plug valve for variable flows through the control, said means comprising a quadrant divided into appropriate sections bearing suitable flow-directions; and an indicator element carried by the plug valve stem.

11. In a multi-way control for liquid distributor systems comprising a casing with diametrically-opposed flow branches, a basal flow-inlet, and an interior medially-located apertured reinforcing flange; the combination of a plug valve in the casing having an axial bore and spaced longitudinal ports with an intervening cut-out divided into upper and lower sections and a medial reinforcing rib for coaction with the interior flange of the casing in governing flow through the control, said valve embodying a tubular stem including an interiorly screw-threaded portion, an axially aligned passage of less diameter defining a seat, and a radial outlet from said passage into a circumferential groove around the valve head; a down passage through the valve body with a radial outlet into an associated lower circumferential groove; spaced longitudinal grooves in the plug valve outer surface with a common connector groove at their lower ends; a longitudinal by-pass in the casing inner surface completing flow communication through and about the plug valve only when the lower portions of the remotely spaced longitudinal grooves register therewith; means enabling supply of lubricant under pressure into the valve tubular stem; a check valve in the tubular stem engaging the seat portion therein; a screw engaged in the valve stem threaded-portion with means whereby it can be independently rotated to force lubricant past the check valve into all of the passages, outlets and grooves aforesaid; means defining and rotatively governing different positions of the plug valve for predetermined flows through the control, said means comprising a quadrant supported in spaced relation to the valve casing and divided into five individual flow-indicating sections; and a coactive pointer arm carried by the plug valve stem.

12. A multi-way plug valve as defined in claim 11 wherein the longitudinal ports are formed in circumferentially-spaced enlargements inwards of said valve plug, and the down passage is through a lengthwise rib intermediate said enlargements.

13. A multi-way plug valve as defined in claim 11 wherein the plug cut-out is defined by longitudinal circumferentially-spaced inwardly-directed rib-portions of said plug valve and the exterior surface of the axial bore wall, and the cut-out is divided into upper and lower sections by an intervening arcual web-like portion.

JAMES A. JENSEN.
RALPH B. ZIEGLER.